United States Patent
Lee

(10) Patent No.: US 7,304,812 B1
(45) Date of Patent: Dec. 4, 2007

(54) CLAMPING FIXTURE AND METHOD FOR WASHING OPTICAL MEMBERS

(75) Inventor: Hsin-Ho Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,433

(22) Filed: Aug. 4, 2006

(30) Foreign Application Priority Data

Dec. 16, 2005 (CN) .......................... 200510120669

(51) Int. Cl.
*G02B 7/02* (2006.01)
(52) U.S. Cl. .................. 359/811; 359/815; 359/818
(58) Field of Classification Search ................ 359/811, 359/815, 817, 818, 819, 821
See application file for complete search history.

(56) References Cited

U.S. PATENT DOCUMENTS

2007/0127143 A1\* 6/2007 Chien .......................... 359/811

\* cited by examiner

*Primary Examiner*—Timothy J. Thompson
(74) *Attorney, Agent, or Firm*—Jeffrey T. Knapp

(57) ABSTRACT

An exemplary clamping fixture (100) for washing optical members (60) includes a base (10), two clamping elements (20, 30), and a securing member (40). The base defines a plurality of holding grooves (13) configured for holding a first portion (61) of each of the optical members therein. The clamping elements are disposed at two sides (12) of the base. Each of the clamping elements has a plurality of holding slots (22) defined therein. The holding slots are configured for holding a second portion (62) of each of the optical members. The securing member is configured for securing the clamping elements and the optical members together in such a manner that the optical members can be removed from the base.

13 Claims, 2 Drawing Sheets

CLAMPING FIXTURE AND METHOD FOR WASHING OPTICAL MEMBERS

FIELD OF THE INVENTION

The present invention generally relates to clamping fixtures and, more particularly, to a clamping fixture and a clamping method configured for washing optical members such as optical lenses, optical filters, or such like.

DESCRIPTION OF RELATED ART

With the ongoing development of microcircuitry and multimedia technologies, digital cameras have become a highly popular way of taking pictures. High-end portable electronic devices, such as mobile phones and personal digital assistants (PDAs), are being developed to include increasing numbers of special features, including digital camera modules. Portable electronic devices which include digital cameras enable consumers to enjoy capturing digital pictures anytime and anywhere, the smallest and most eye-catching of such electronic devices being the most popular.

In camera modules, optical lens quality is very important to the quality of the pictures captured by the camera modules. In the process of manufacturing, the optical lenses need to be washed before applying a film thereon. Generally, optical elements are washed using ultrasound in a vessel filled with liquid. The optical elements are prone to collide with each other during cleaning. As a result, a surface of each optical element may easily be scraped or damaged. To prevent this optical elements need to be fixed in a clamping fixture so that the optical elements are separated from each other and do not collide with each other.

A typical clamping fixture is a holding board defining a plurality of receiving holes therein. Each receiving hole has a shape and size corresponding to the optical element. In use, each optical element is received in one of the receiving holes, and the holding board is then put in a liquid to be washed using ultrasound. However, those parts of surfaces of the optical elements touching the holding board cannot be washed using this process.

Therefore, a new clamping fixture is desired in order to overcome the above-described shortcomings.

SUMMARY OF THE INVENTION

In one embodiment thereof, a clamping fixture for washing optical members includes a base, two clamping elements, and a securing member. The base defines a plurality of holding grooves configured for holding a first portion of each of the optical members therein. The clamping elements are disposed at two sides of the base. Each of the clamping elements has a plurality of holding slots defined therein. The holding slots are configured for holding a second portion of each of the optical members. The securing member is configured for securing the clamping elements and the optical members together in a manner that they can be removed from the base.

Other advantages and novel features of the embodiments will become more apparent from the following detailed description thereof when taken in conjunction with the accompanying drawings.

BRIEF DESCRIPTION OF THE DRAWINGS

Many aspects of the present clamping fixture can be better understood with reference to the following drawings. The components in the drawings are not necessarily drawn to scale, the emphasis instead being placed upon clearly illustrating the principles of the clamping fixture and its potential applications. Moreover, in the drawings, like reference numerals designate corresponding parts throughout the several views.

DETAILED DESCRIPTION OF THE INVENTION

Figure 1:
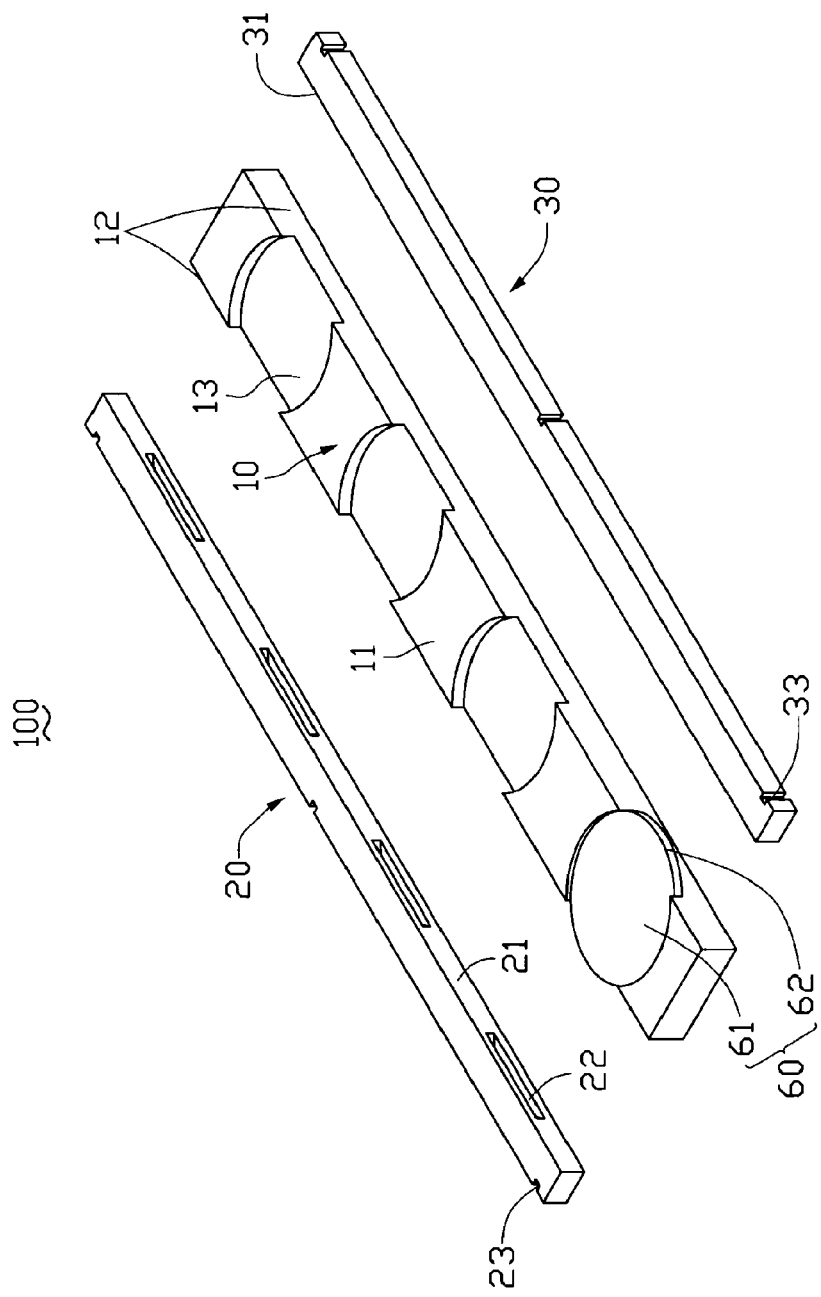
FIG. 1 is an exploded, schematic view of a clamping fixture in accordance with a preferred embodiment.
Figure 2:
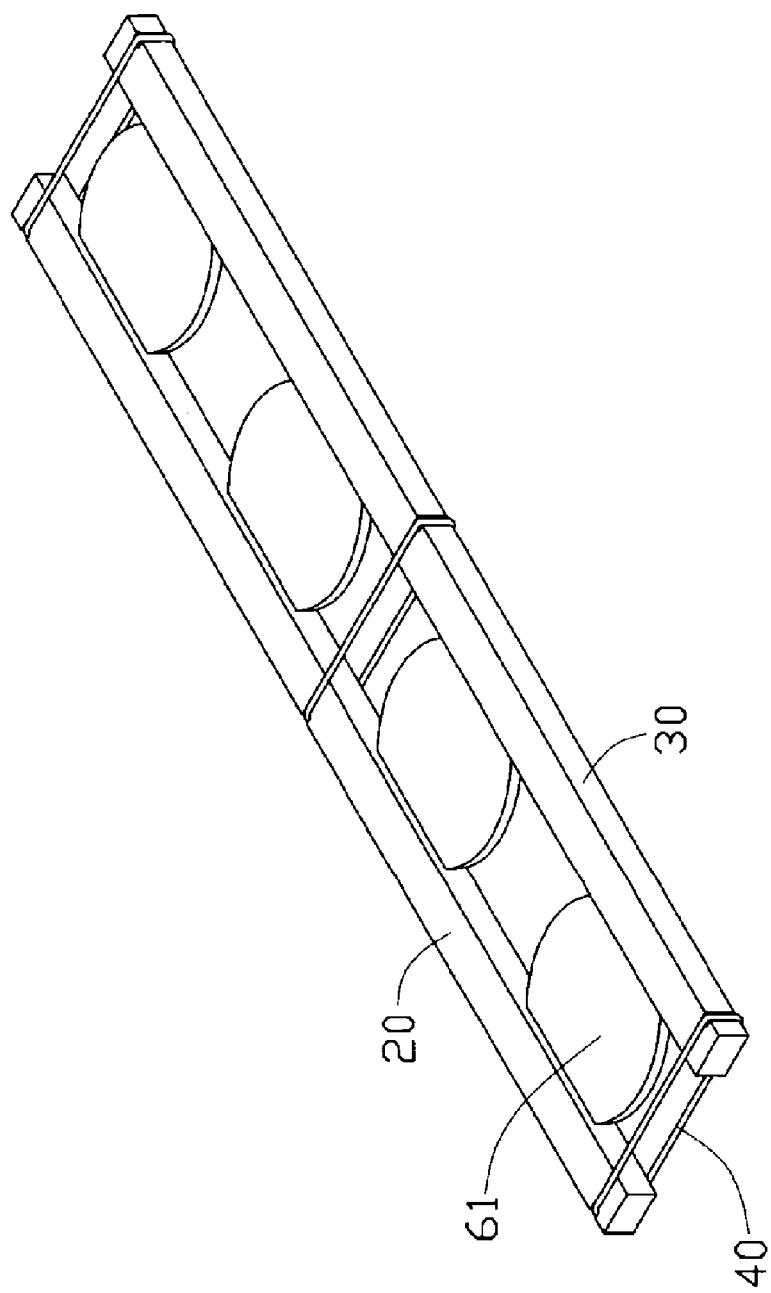
FIG. 2 is an assembled, schematic view of the clamping fixture in FIG. 1.

Referring now to the drawings in detail, FIGS. 1 and 2 show a clamping fixture 100 of a preferred embodiment of the present invention. The clamping fixture 100 is capable of securing and simultaneously washing a plurality of optical members 60. In this embodiment, the optical members 60 may be optical lenses, optical filters, or such like. The clamping fixture 100 includes a base 10, a first clamping element 20, a second clamping element 30, and a predetermined amount of securing members 40.

The base 10 is a supporting board and has a top surface 11 therein. A predetermined amount of holding grooves 13 are linearly formed on the top surface 11 of the base 10. The holding grooves 13 are configured for supporting and holding a first portion 61 of each of the optical members 60 therein. In this embodiment, the optical members 60 are circular in shape, and the holding grooves 13 are arcuate grooves. A second portion 62 of each of the optical members 60 projects out of the holding grooves 13 of the base 10. Understandably, when the optical members have non-circular shapes, the holding grooves 13 can have a shape corresponding to that shape.

The first clamping element 20 and the second clamping element 30 are disposed on opposing sides 12 of the base 10. The first clamping element 20 has a first holding surface 21, and the second clamping element 30 has a second holding surface 31. The first clamping element 20 and the second clamping element 30 each define a predetermined amount of holding slots 22 on the holding surfaces 21, 31. The holding slots 22 are distributed according to the distribution of the holding grooves 13 of the base 10. The holding slots 22 are configured to contain or hold the second portion 62 of each of the optical members 60. A predetermined amount of securing grooves 23, 33 are formed on an opposite side to the holding surfaces 21, 31. In this embodiment, the holding slots 22 are arcuate slots, and the second portion 62 of each of the optical members 60 can be held in the arcuate slots. Understandably, the holding slots can also be rectangular slots to hold the second portions 62 of each of the optical members 60.

The securing members 40 are configured for securing the first clamping element 20, the second clamping element 30, and the optical members 60 together. In this embodiment, the securing members 40 can be soft or flexible cords or ties. The securing members 40 secure the first clamping element 20 and the second clamping element 30 by wrapping around the securing grooves 23, 33.

Also referring to FIG. 2, in use, a plurality of optical members 60 are disposed in the holding grooves 13 of the base 10. The first clamping element 20 and the second clamping element 30 are moved toward the two sides 12 of the base 10 in such a manner that the second portion 62 of each of the optical members 60 is held in the holding slots 22. The securing members 40 are then used to secure the clamping elements 20, 30 and the optical members 60 together in such a manner that the optical members 60 can be removed from the base 10. Finally, the secured optical members 60 together with the clamping elements 20, 30 are removed from the base 10, and are disposed in a washing bar (not shown) to be washed.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clamping fixture for washing optical members, comprising:
    a base defining a plurality of holding grooves configured for holding a first portion of each of the optical members therein;
    two clamping elements disposed at two sides of the base, each of the clamping elements having a plurality of holding slots defined therein, the holding slots being configured for holding a second portion of each of the optical members; and
    a securing member configured for securing the clamping elements and the optical members together in a manner such that they can be removed from the base.

2. The clamping fixture as claimed in claim 1, wherein the base has a top surface, and the holding grooves are linearly defined on the top surface.

3. The clamping fixture as claimed in claim 1, wherein the optical members are circular in shape.

4. The clamping fixture as claimed in claim 3, wherein the holding grooves are arcuate grooves, and the second portion of each of the optical members projects out of the arcuate grooves.

5. The clamping fixture as claimed in claim 3, wherein the holding slots are arcuate slots, and the second portion of each of the optical members are held in the arcuate slots.

6. The clamping fixture as claimed in claim 1, wherein the holding slots are rectangular slots.

7. The clamping fixture as claimed in claim 1, wherein the securing member is a soft and flexible cord.

8. A method for washing optical members, comprising the steps of:
    placing a plurality of optical members on a plurality of holding grooves of a base, a first portion of each of the optical members being held on the holding grooves, and a second portion of each of the optical members projecting out of the holding grooves;
    moving two clamping elements toward two sides of the base, each of the clamping elements having a plurality of holding slots to hold the second portion of each of the optical members therein;
    securing the clamping elements with the optical members held between the clamping elements;
    removing the optical members together with the clamping elements from the base; and
    disposing the optical members together with the clamping elements in a washing bar to wash the optical members.

9. The method as claimed in claim 8, wherein the base has a top surface, and the holding grooves are linearly defined on the top surface.

10. The method as claimed in claim 8, wherein the optical members are circular in shape.

11. The method as claimed in claim 10, wherein the holding grooves are arcuate grooves, and the second portion of each of the optical members projects out of the arcuate grooves.

12. The method as claimed in claim 10, wherein the holding slots are arcuate slots, and the second portion of each of the optical members are held in the arcuate slots.

13. The method as claimed in claim 8, wherein the holding slots are rectangular slots.

* * * * *